US009880312B2

(12) United States Patent
Slater et al.

(10) Patent No.: US 9,880,312 B2
(45) Date of Patent: Jan. 30, 2018

(54) INTELLIGENT SPECTRAL INDUCED POLARIZATION MEASUREMENT MODULE

(71) Applicants: ONTASH & ERMAC, INC., River Edge, NJ (US); RUTGERS, THE STATE UNIVERSITY OF NEW JERSEY, New Brunswick, NJ (US)

(72) Inventors: Lee Slater, Portland, ME (US); Dimitrios Ntarlagiannis, River Edge, NJ (US); Frank Curatola, River Edge, NJ (US); Dean Pappas, Hamilton Square, NJ (US); Donald V. Le Roy, Doylestown, PA (US); Konstantin Evdokimov, Belmont, MA (US)

(73) Assignees: ONTASH & ERMAC, INC., River Edge, NJ (US); RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 859 days.

(21) Appl. No.: 14/085,789

(22) Filed: Nov. 20, 2013

(65) Prior Publication Data
US 2014/0218037 A1 Aug. 7, 2014

Related U.S. Application Data

(60) Provisional application No. 61/728,801, filed on Nov. 20, 2012, provisional application No. 61/793,941, filed on Mar. 15, 2013.

(51) Int. Cl.
*G01V 3/28* (2006.01)
*G01V 3/24* (2006.01)

(52) U.S. Cl.
CPC . *G01V 3/28* (2013.01); *G01V 3/24* (2013.01)

(58) Field of Classification Search
CPC .................................. G01V 3/24; G01V 3/28
(Continued)

(56) References Cited

U.S. PATENT DOCUMENTS 3,902,113 A 8/1975 Bridges et al.
4,209,747 A 6/1980 Huchital
(Continued)

FOREIGN PATENT DOCUMENTS

| CN | 1034276 | 7/1989 |
| CN | 101669044 | 3/2010 |
| SU | 1004940 | 3/1983 |

OTHER PUBLICATIONS

International Search Report issued in PCT/US13/71110 dated Apr. 3, 2014.
(Continued)

*Primary Examiner* — Christopher Mahoney
(74) *Attorney, Agent, or Firm* — John S. Paniaguas; Clark Hill PLC (57) ABSTRACT

A system for spectral induced polarization measurement of a formation is provided. The system provides an intelligent module to be utilized in performing spectral induced polarization (SIP) measurements for geophysical studies or otherwise. The system includes a instrument that includes a housing configured to be inserted into a surface opening. The housing houses a signal generator that generates an excitation signal. A drive electrode directs the excitation signal into the material adjacent the housing. A plurality of electrodes sense the voltage and/or current in the material adjacent the housing and a processor processes the sensed voltage and/or current to measure a property of the material. The system also provides a configuration in which a plurality of instruments configured for spectral induced polarization measurements are interconnected to provide communi-
(Continued)

cation, synchronization, a common reference signal or power.

51 Claims, 7 Drawing Sheets

(58) Field of Classification Search
USPC .......................................................... 324/339
See application file for complete search history.

(56) References Cited

U.S. PATENT DOCUMENTS

| | | | |
|---|---|---|---|
| 4,359,687 A | 11/1982 | Vinegar et al. | |
| 4,361,808 A * | 11/1982 | Kern | G01V 3/24 324/366 |
| 4,583,046 A | 4/1986 | Vinegar et al. | |
| 4,658,215 A | 4/1987 | Vinegar et al. | |
| 4,743,854 A | 5/1988 | Vinegar et al. | |
| 4,875,015 A | 10/1989 | Ward | |
| 2003/0090269 A1 * | 5/2003 | Fanini | G01V 3/28 324/339 |
| 2009/0322337 A1 | 12/2009 | Zhao et al. | |
| 2010/0148788 A1 * | 6/2010 | San Martin | G01V 3/24 324/369 |
| 2010/0176812 A1 * | 7/2010 | Bittar | G01V 3/24 324/339 |
| 2012/0062223 A1 * | 3/2012 | Olsson | G01R 33/10 324/252 |
| 2013/0013211 A1 * | 1/2013 | Kumar | B82Y 15/00 702/7 |
| 2015/0106016 A1 * | 4/2015 | Wu | G01V 3/38 702/6 |

OTHER PUBLICATIONS

Wen Jing-ya, et al., "Research and Design of Novel Digital Control System for Induced Polarization Logging Instrument", Coal Technology, Jul. 2011, 30(7).

* cited by examiner

INTELLIGENT SPECTRAL INDUCED POLARIZATION MEASUREMENT MODULE

RELATED APPLICATION

The present application claims priority to U.S. Provisional Patent Application No. 61/728,801 filed Nov. 20, 2012 and U.S. Provisional Patent Application No. 61/793,941. The entire disclosure of each of the foregoing applications is hereby incorporated by reference.

GOVERNMENT RIGHTS STATEMENT

The invention described herein was made with funds provided under Award #IIP-1214964 by the National Science Foundation. The government has certain rights in this invention.

FIELD OF THE INVENTION

The present invention relates to the field of geophysical logging. More specifically, the present invention relates to a fully integrated intelligent module to be utilized in performing spectral induced polarization (SIP) measurements for geophysical studies. Additionally, the invention relates to geophysical studies performed using resistivity, time domain induced polarization and spontaneous or self potential methods Geophysical logging tools often provide critical information on the physics and chemistry of the subsurface environment. SIP provides information that other technologies do not. One application for near surface geophysical methods is the estimation of hydrological parameters (e.g. permeability, or hydraulic conductivity [K]). However, known geophysical methods do not accurately quantify spatial variability in this parameter over a wide range of conditions. Therefore, it would be desirable to provide a geophysical technique that permits a non-invasive measurement of K. In an effort to improve hydraulic parameter predictions, such as K, SIP has a distinctive advantage: length scales of relaxations extracted from SIP measurements are well correlated with length scales of relaxation that quantify groundwater flow/transport. The time constant ($\tau$), which is associated with the mean relaxation of the frequency dispersion, is related to the square of a characteristic pore or grain size that defines the length-scale over which ions in the electrical double layer diffuse during application of an electric current. SIP measurements of the time constant of the interfacial polarization ($\tau$) may facilitate the geoelectrical estimation of the effective characteristic length scale controlling fluid flow as defined from application of percolation theory to porous media.

BACKGROUND

Spectral Induced Polarization (SIP) is an electrical method used to map variations in the electrical properties of the earth. SIP is based on the fact that when an electric field is applied to the ground, electric current flows through the earth and charge separation takes place at mineral-fluid interfaces. In other words, the mineral-fluid interface becomes electrically polarized.

SIP systems are used in exploration, water resources and environmental industries to investigate the physicochemical properties of the earth. SIP systems use electrical measurements of earth materials to also estimate geochemical and biogeochemical processes in the subsurface; field applications of the SIP method are based on successful laboratory experiments.

Spectral Induced Polarization (SIP) is an accepted method for measuring the low frequency electrical properties of earth materials. The prior patent by Vinegar and Waxman (V&W) U.S. Pat. No. 4,359,687 issued Nov. 16, 1982 "Method and Apparatus for Determining Shaliness and Oil in Earth Formations Using Induced Polarization in the Frequency Domain" lays out a configuration of a sonde and borehole measurement system utilizing SIP. Vinegar and Waxman U.S. Pat. No. 4,583,046 issued Apr. 14, 1986 "Apparatus for the Focused Electrode Induced Polarization Logging" includes current focusing to improve resolution.

SIP borehole systems, like the ones described in the V&W patents, have numerous shortcomings. For instance, such systems have limited functionality because they require external connections for power, stimulus generation, data acquisition, data processing, data storage, and control. Additionally, the V&W systems electronics are dependent on the number of electrodes, geometrical electrode spatial configuration, excitation and sensing methods, and focusing techniques. Additionally, existing systems are incapable of conducting closed loop control of excitation and focusing based on real time data collection, data processing or data storage entirely within a sonde for borehole analysis or as part of a system that is placed at the surface for near surface analysis. Additionally, V&W focusing electrode arrangements require that the electrodes are located a great distance from each other with several electrodes located outside the sonde. Additionally, existing focusing techniques and systems in general are not optimized for low power operation.

SUMMARY OF THE INVENTION

The present invention is an intelligent SIP measurement module that can be integrated into a sonde and used for borehole SIP analysis, or a system that is placed at the surface for near surface SIP analysis. Additionally the module has the flexibility to perform other types of near surface and borehole analysis, such as time domain induced polarization, resistivity and spontaneous or self potential measurements. The present invention provides the ability to perform such measurements without the need for some or all of the following external connections for i) power, ii) stimulus generation, iii) data acquisition, iv) data processing, v) data storage and vi) control. Additionally, the present invention provides the flexibility to support configurations varying in i) the number of electrodes, ii) the types of electrodes, iii) the geometrical electrode spatial layout, iv) excitation methods, v) sensing methods and vi) focusing techniques. Additionally, the present invention is capable of autonomously conducting a closed loop experiment by controlling excitation and focusing based on real time data collection, processing and storage entirely within the sonde or system that is placed at the surface. Additionally, the signal generation, the signal processing and data analysis algorithms can be adapted in software to suit the application. Additionally, the present invention can be arranged as a system of inter-connected modules to provide i) fault tolerance, ii) a greater range of geometrical electrode spatial layouts, iii) improved accuracy and resolution, iv) improved formation penetration and iv) improved speed and throughput. Additionally, the present invention includes low power focusing.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring now to the figures in general and to FIGS. 1-4 specifically, a geophysical logging system is designated generally 10. The system 10 uses spectral induced polarization (SIP) methodology to measure the low frequency electrical properties of subsurface earth media. The intelligent SIP measurement module, or simply module, 41 interfaces with a plurality of electrodes of either polarizing or non-polarizing types. Specifically, the intelligent SIP measurement module interfaces with a plurality electrodes 66, 67 for emitting signals, a plurality of non-polarizing electrodes for detecting signals 42, 43, 64, 65 and a plurality of electrodes for guarding/focusing signals 60, 61, 62, 63. More specifically, the module 41 includes a plurality of interfaces, including: a plurality of interfaces to the electrodes for inducing an electrical current into the area surrounding the sonde 66, 67, a plurality of interfaces to the electrodes for detecting the current 42 and potential 43, 64, 65 for detecting potential and a plurality of interfaces to the electrodes for focusing the electrical fields 60, 61, 62, 63. In the present instance, the induced current is a time-variable signal containing a mixture of one or several frequencies and the impedance or vector-quantity resistivity is measured by analyzing the response of the formation to each of the excitation current frequencies.

Figure 1:
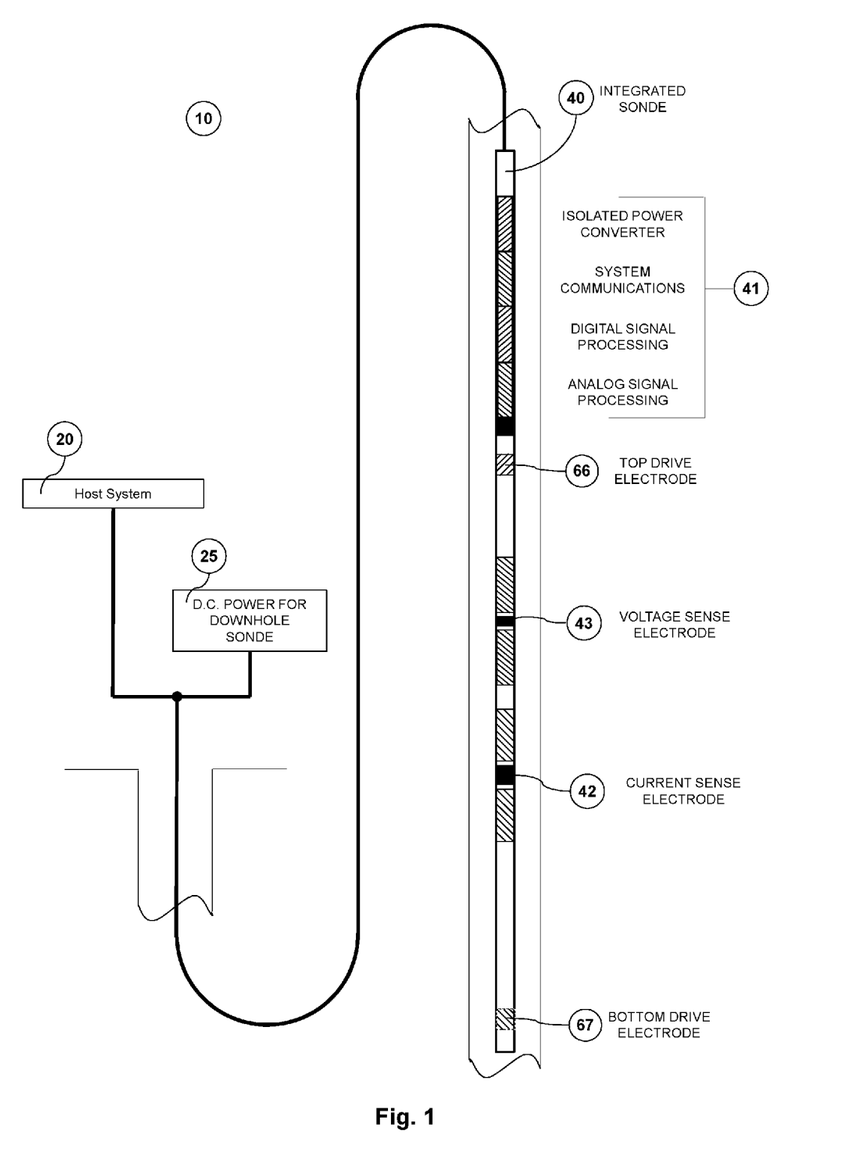
FIG. 1 is a diagrammatic view of a system for SIP measurement of subsurface materials.
Figure 2:
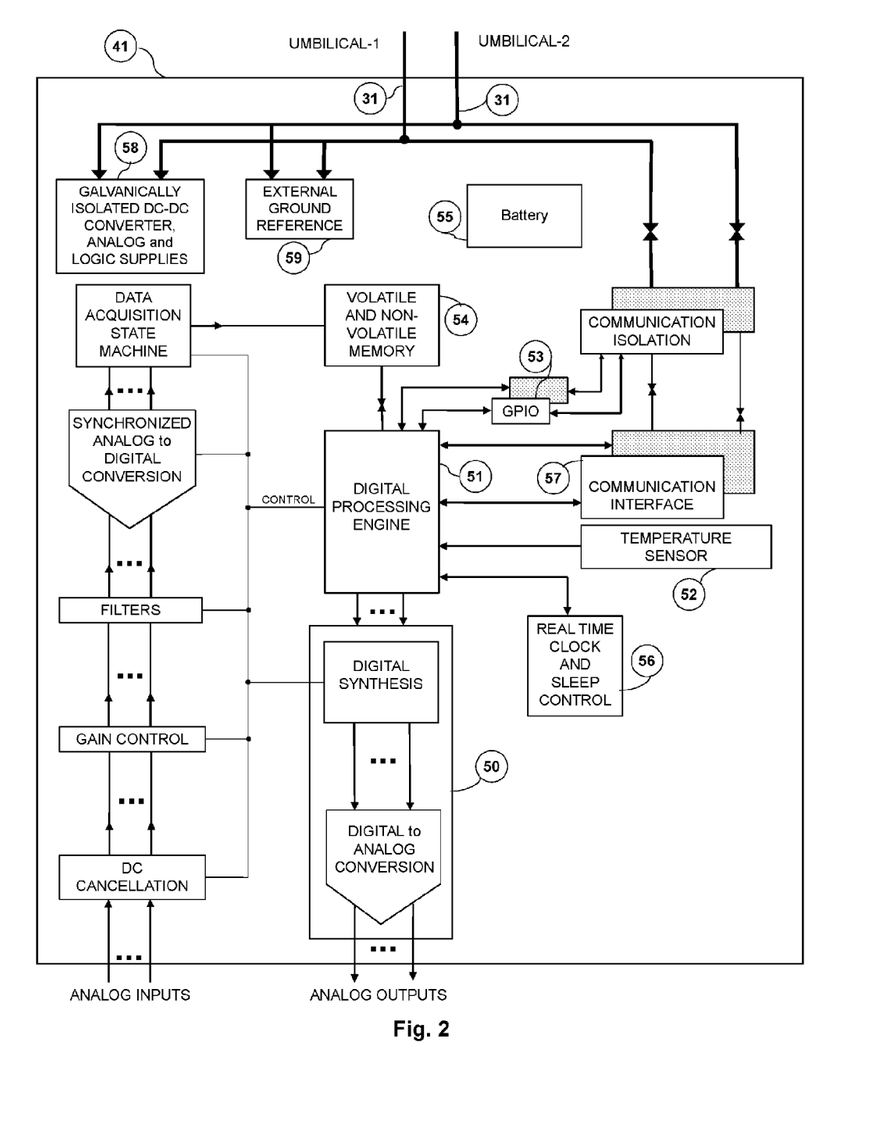
FIG. 2 is a block diagram of circuitry of an SIP measurement tool of the system illustrated in FIG. 1.

Referring to FIG. 1 and FIG. 2, the borehole tool or sonde 40 is connected to the host system 20 and power supply 25, located at the surface. Either or both the host system 20 and power supply 25 are not necessary, instead the sonde 40 can operate autonomously, without the host system 20 or power supply 25, using either its internal battery 55 or its non-volatile storage device 54 or both. Each sonde 40 supports modes of operation where it may operate independently or be connected with one or two other sondes 40, one or two host systems 20 through its umibilical-1 and umibilical-2 interfaces 31. The interfaces of the umbilicals 31 each have a general purpose digital input and output (GPIO) interface 53, a communication interface 57, and a connection to galvanically isolated power supply 58. The galvanically isolated power supply 58 powers the analog and digital components of the sonde 40 and establishes the circuit ground reference. The sonde 40 has an external ground reference interface 59 that can be connected to an external ground reference for the purpose of conducting measurements where a plurality of sondes 40 configured to share the external ground reference. Additionally, the power supply 25 can be a renewable energy source such as solar, wind, geothermal, or hydroelectric.

In the present instance, the host system 20 is a computer, such as a personal computer (PC) or other element that is capable of exchanging data in digital formats and the power supply 25 is a separate DC power source. In the present instance, the host system 20 and power supply 25 are connected to the sonde via an umbilical connection 31 configured to provide a source of power and a data connection. The invention supports two umbilical connections 31 for the purpose of supporting system arrangements of inter-connected sondes 40 with or without host systems to provide i) fault tolerance, ii) a greater range of geometrical electrode spatial layouts iii) improved accuracy and resolution, iv) improved formation penetration and iv) improved speed and throughput. A fault tolerant arrangement can be a complete ring of inter-connected sondes 40 with or without host systems 20 in the ring. The sonde 40 includes a real time clock 56 which can place the sonde 40 into and out of a low power sleep mode. The clock 56 may be connected with a separate battery source, such as a back-up battery. Specifically, at particular times or time intervals, the sonde 40 may be switched into a low power mode in which the signal generator does not generate a signal to be induced into the subsurface material. Similarly, at particular times or time intervals, the sonde 40 may be switched form the sleep mode to a normal operating mode in which the signal generator generates a signal to be induced into the subsurface material. The sonde is switched into and out of sleep mode in response to the time information provided by the clock 56. During the low power sleep mode, other elements of the sonde may also be inoperable, so that the sonde draws little power from the power source. Additionally, the sonde 40 can be placed into and out of sleep mode by the host system via one of the umbilical 31 connections. In addition to providing signals that can be used to switch the sonde into or out of sleep mode, the time signals may be used to time stamp the measurements of the electrodes. In this way, the information relating to the time when a measurement was taken can be stored along with the data related to the measurement.

Still referring to FIGS. 1 and 2, the electrodes are incorporated into the sonde 40 and configured to be inserted into a borehole. Typically the borehole will be filled with water and/or mud. In addition to communications and power, the umbilical connection 31 provides mechanical support. The umbilical connection 31 may include a separate tensile member that provides sufficient strength to support the weight of the sonde and any inter-connected sondes and is able to withstand the fluid and drag forces when the sonde is removed from the borehole.

Referring to FIGS. 1-4, the details of a sonde 40 are illustrated. The sonde 40 features a housing that houses a modified 4-lead Kelvin-sensing arrangement having a current sense electrode 42 for detecting the current that is induced by the drive electrodes 66, 67 placed symmetrically above and below the current sense electrode 42. A voltage sense electrode 43 placed between one of the drive electrodes 66, 67 and the current sense electrode 42 measures the borehole potential induced by the drive electrodes 66, 67. Additionally, local voltage sense electrodes 64, 65 are placed directly above and below the current sense electrode 42. The current sense electrode 42 and the voltage sense electrode 43 are each flanked above and below with equi-potential guard electrodes 62, 63 and 60, 61 respectively, for the purpose of focusing the sense currents radially beyond the borehole wall. Both current and voltage measurements will be made as described later. Additionally, the sonde 40 also includes an on-board processor 51 within the housing for converting the detected voltage and current into a data set that can be stored in a non-volatile memory or communicated with the host system 20 on the surface or with another sonde 40 via the umbilical cable 31. The processor 51 may be any of a variety of microprocessors, such as a microprocessor for executing instructions in software. In the present instance, the processor is a digital signal processor.

The sonde 40 is galvanically isolated from earth ground or "floating", in order to prevent distortion of the measurement. Without this isolation, connections between Earth and the circuit(s) at the host system 20, or capacitive conduction between the power delivery wiring in the umbilical 31 and the borehole may distort the measurements made of the formation under investigation. To achieve this isolation, both the power supply onboard the instrument and the communications interface 57 are constructed with electrical isolation. Even so, the isolation boundary will appear as a shunt impedance in parallel with the drive electrodes 66, 67 and current measurement electrodes 64, 65. For this reason, the shunt resistance across the supply and communications provides isolation that is greater than $10^{10}$ Ohms, and a shunt capacitance that is less than 150 pF. This will limit the AC leakage current across the isolation barrier to sub nanoAmp levels at DC, and to less than hundreds of nano-Amps (rms) at the supply's switching frequency. This potential interference occurs well above the target frequency range of 0 to 20 kHz and may be easily filtered from the resulting measurements. Alternatively, power supply isolation, as well as autonomous operation, can be achieved by utilizing an integrated battery or other means of storing power within the sonde, such as a capacitor.

Referring now to FIGS. 1-4, the circuitry that is resident onboard the sonde 40 within the housing will be described in greater detail. The sensor circuit or front-end includes four components: (i) a current to voltage converter 70 shown on FIG. 3 or, alternatively, a current to voltage converter 71 shown on FIG. 4 (ii) an electrometer 48; (iii) a control amplifier 49; and (iv) a signal generator 50. The housing is a fluid-tight enclosure to impede the migration of dirt and fluid into the housing. The housing is non-metallic so that the induced current from the signal generator does not conduct through the housing. In this way, the housing protects the internal circuitry from damage from the elements within the borehole. Each of the four elements of the circuitry is described below.

The Current (I) to Voltage (E) Converter

Figure 3:
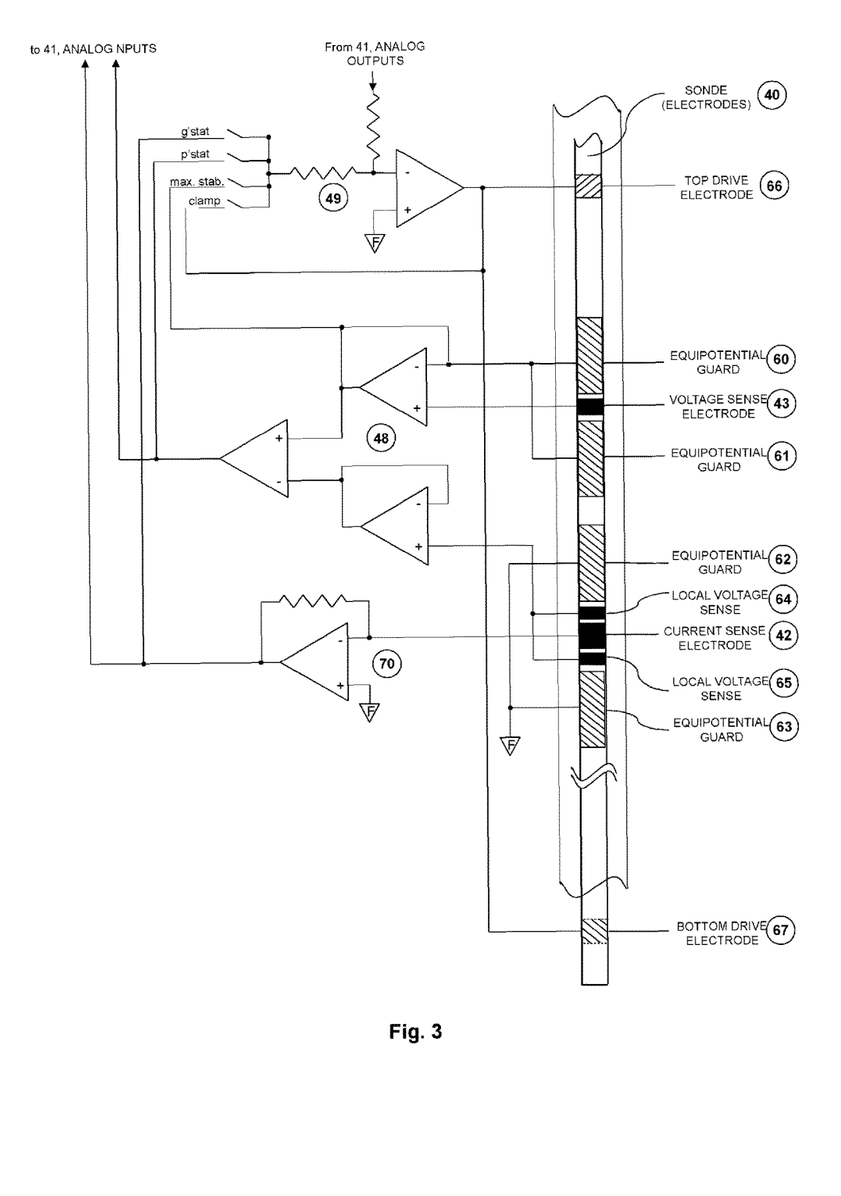
FIG. 3 is a diagrammatic view of an SIP measurement tool of the system illustrated in FIG. 1.
Figure 5:
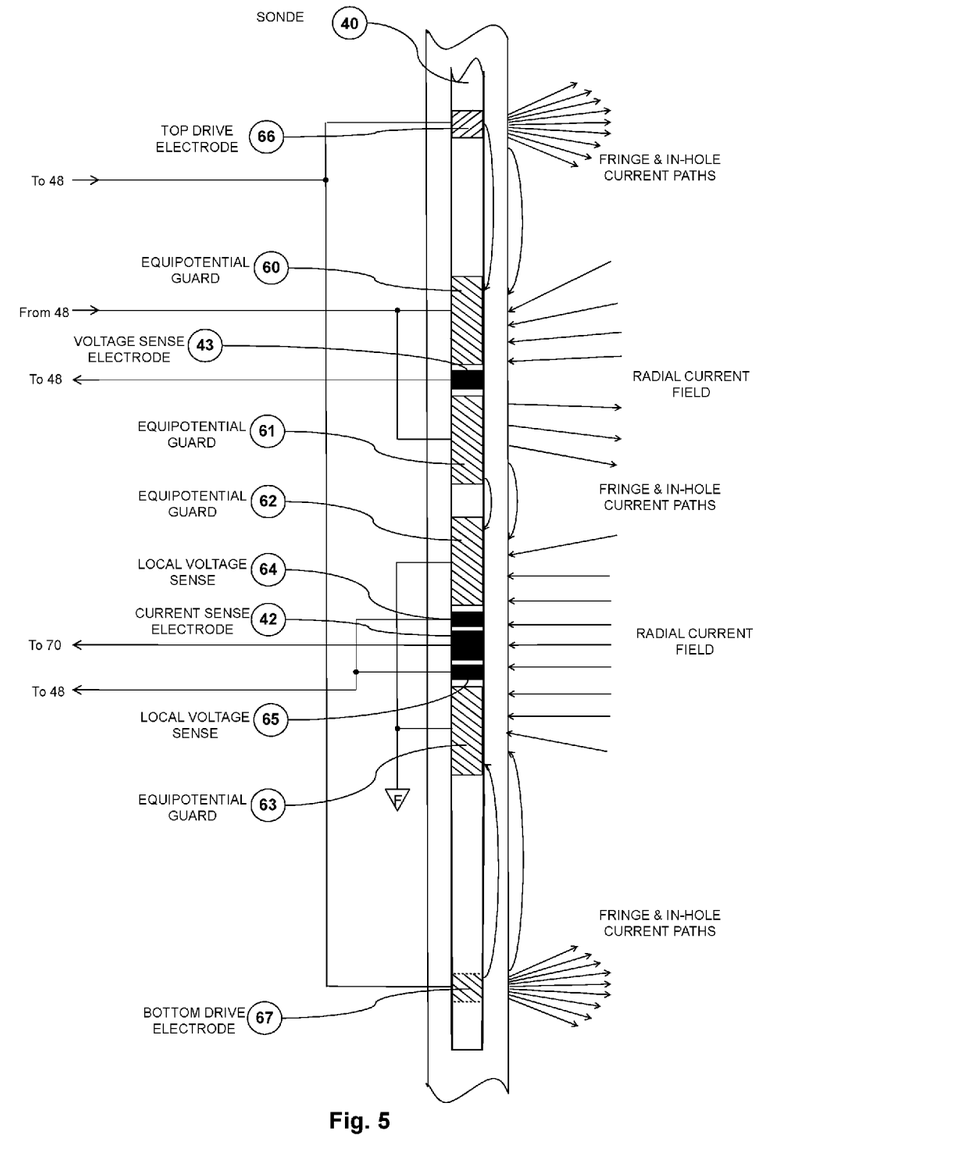
FIG. 5 is a block diagram of an SIP measurement tool of the system illustrated in FIG. 1, illustrating the drive and guarding/focusing currents in the borehole and in the surrounding formation.

The current sense electrode 42 senses the current in the subsurface material as shown in FIG. 5. Referring to FIG. 3, the current sense electrode 42 is connected with the I to E converter 70. The sonde 40 in FIG. 3 is of the "virtual ground" type. The output of the I to E converter 70, is proportional to the current either sourced or sunk at the current sense electrode 42, while the steady-state potential is held at the floating circuit ground within several micro-Volts. As a result, the flanking equipotential focus/guard electrodes 62, 63 may simply be connected to circuit ground to provide radial current focusing beyond the borehole wall to further minimize power consumption.

Figure 4:
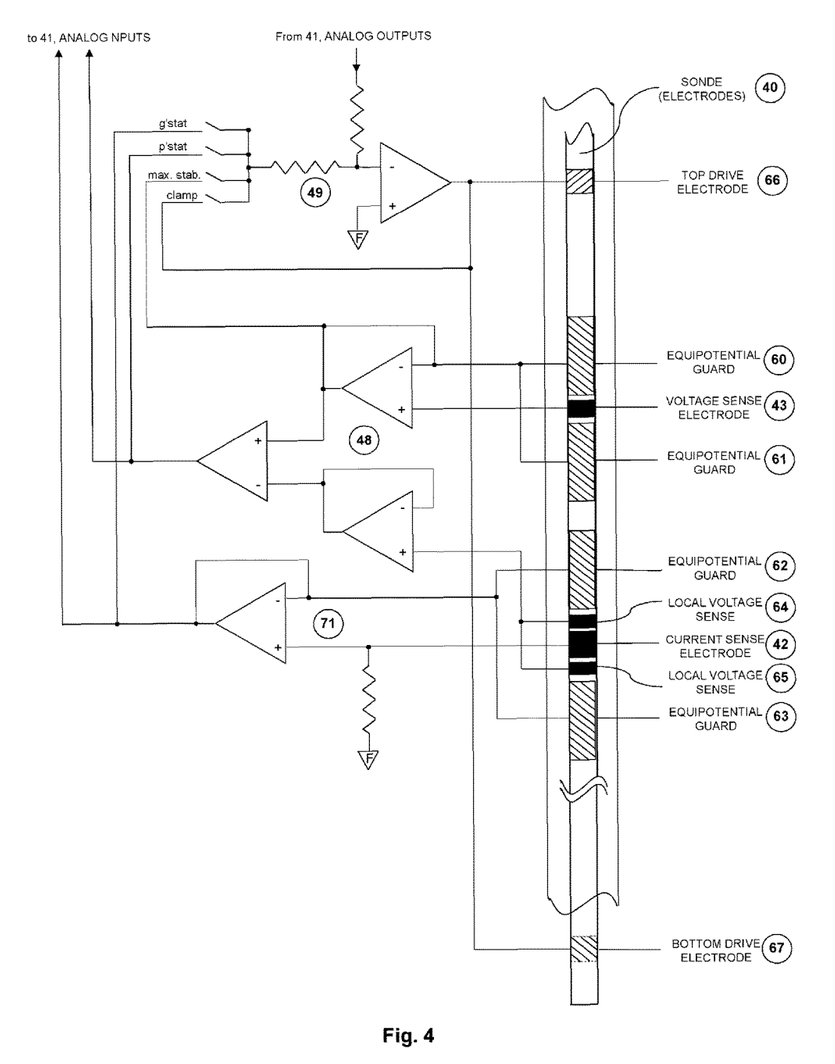
FIG. 4 is a diagrammatic view of an alternate embodiment of an SIP measurement tool of the system illustrated in FIG. 1.

Alternatively, the scheme described in FIG. 4 may be utilized. This I to E converter 71 is a grounded resistor-type. Because of the small drive-signal-related changes in potential at current sense electrode 42, the equipotential guards 62, 63 can be driven by a buffer amplifier with sufficient current drive to equal the control amplifier's 49 current but at the potential and phase of the current sense electrode 42 rather than being connected as in FIG. 3. Alternatively, the equipotential guard/focus electrodes 62, 63 can be driven by a circuit controlled by the digital processing engine 51 shown in FIG. 2.

The resultant measured current sensed by the current sense electrode 42 from the excitation applied at the drive electrodes 66,67 is correlated with the voltage sensed across the voltage sense electrode 43 and the local voltage sense electrodes 64, 65. These two signals are sent to the analog signal processing section of the in-sonde support, signal processing, control, power and communications circuitry 41.

The Electrometer, or Differential Input, High Input Impedance, Voltage Meter

Electrode 43 detects the voltage in the subsurface material as shown in FIG. 5. The voltage sensed across the formation is taken as the difference between the potentials at the voltage sense electrode 43 and the local voltage sense electrodes 64, 65 flanking the current sense electrode 42. The negative connection of the electrometer 48 is taken near the current sense electrode 42, with a separate wire and flanking electrodes 64, 65 that do not carry the measured current to the I to E converter 70, or alternatively 71. The positive terminal of the electrometer 48 is connected to the voltage sense electrode 43. The electrometer 48 is designed to present greater than $10^{12}$ Ohms and less than 5 pF capacitance shunted across the two measurement terminals, with similar leakages presented with respect to the circuit ground. The leakage currents into both electrometer terminals shall be less than several 10's of pico-Amps.

The positive terminal of the electrometer 48 is flanked with equipotential guard/focus electrodes 60, 61. These are driven with buffer amplifiers to a potential within several micro-Volts of that sensed at the buffer amplifier. Alternatively, the equipotential guard/focus electrodes 60, 61 can be driven by a circuit controlled by the digital processing engine 51 in FIG. 2.

The Control Amplifier (CA)

Referring to FIGS. 2 and 3, the control amplifier 49 is a high current amplifier that provides excitation to the subsurface formation under investigation. The CA is designed for outputs from DC to a minimum of 20 kHz, with a minimum +/−10V compliance voltage at minimum of 0.2 Amp. There are multiple controls on the CA 49 that can be chosen based on the advantages/disadvantages each mode offers and depending on the conditions in the particular application for the sonde. These controls are:

1. Feedback from its own output "clamp". "Clamp" mode is conceptually the simplest, with no direct control exercised over the magnitude of the excitation actually applied to the formation;
2. Feedback from the electrometer output, "p' stat". "p' stat" mode controls the CA so as to provide a constant AC potential magnitude across the formation over the full range of frequencies;
3. Feedback from the voltage sense buffer "max. stab.". "max. stab." mode controls the CA so as to provide a constant AC potential at this part of the formation over the full range of frequencies; and
4. Feedback from the I to E output, "g' stat". "g' stat" mode controls the CA output in order to maintain a constant amplitude sensed AC current.

The top drive electrode 66 and bottom drive electrode 67 are connected with the control amplifier 49 so that current from the control amplifier is induced into the subsurface material so that the induced current propagates through the subsurface material to be investigated.

The Signal Generator

Referring now to FIG. 2, the signal generator 50 provides various types of periodic or non-periodic excitation signals of controlled magnitude and duration. The types of excitation signal include but are not limited to DC signals of controlled amplitude, sinusoidal signals of controlled amplitude and frequency from 1 milli-Hertz through 20 kHz, discrete and continuous sine sweeps, multi-frequency signals, square-wave signals and time-domain signals to support time-domain induced polarization measurements. The selection of type and parameters of excitation signal are performed by the digital processing engine 51.

Analog Signal Processing

For the SIP measurement, digital signal processing is performed after digitization to determine the complex impedance of the formation over a range of frequencies from 1 milli-Hertz to approximately 20 kHz. The magnitude of the impedance can easily vary over six decades within this frequency range. Combined with the electrical noise sources often present in the environment of the measurement site, digital signal processing techniques are used to provide maximum resolution after the analog to digital conversion. Additionally, adaptive DC cancellation is applied and a selectable gain between 1 and 1000 follows. The gain stage is combined with active filtering so that environmental noise is attenuated. Additionally, the DC cancellation at the input of the analog signal processing chain is performed so that high gains do not cause voltage saturation in the subsequent signal chain.

The host system 20 provides a "virtual control panel" for the sonde, which also facilitates access to and control of the instrument.

Referring to FIG. 2, the present embodiment includes a temperature sensor 52 to measure temperature of the surrounding formation. The temperature measurement can be used to correct other measurements for temperature related effects. Additionally, the present system is capable of autonomously conducting a closed loop experiment by controlling excitation and focusing based on real time data collection, processing and storage entirely within the sonde. Such closed loop experiments can be used to perform real time adjustments to the excitation and focusing based on sensor feedback. Closed loop operation provides features including but not limited to i) power savings, ii) experiment feedback adjusted optimized focusing and excitation iv) optimized time required for measurement, v) optimized accuracy of measurements, vi) optimized spatial accuracy and resolution. Additionally, the present system is capable of performing time-domain induced polarization measurements, resistivity and spontaneous or self potential measurements. The results of resistivity, time-domain and spontaneous potential measurements are stored in the non-volatile memory 54 and can be used to adjust the parameters of excitation and focusing of consecutive SIP measurements under the closed control loop control performed by the digital processing engine 51. The digital processing engine 51 software and algorithms can be customized to support various system applications and embodiments.

Discussion of the Electrical Current Focusing Scheme Employed

Referring now to FIGS. 3-5, the presence of drilling mud or water or a combination of both between the sonde and the borehole wall, mud cake layer formed on the borehole wall, the mud filtrate area, and the invaded zone near the borehole wall can all complicate the measurement of the uninvaded zone of the formation. Accordingly, to make the measurement, the current sensing electrode 42 and voltage sensing electrode 43 measure the formation properties of the area adjacent to the borehole wall. For instance, electrodes 42, 43 may measure the formation properties in a shallow region adjacent to the borehole wall without direct contact.

In order to minimize the effect of longitudinal in-borehole currents coming directly from the drive electrodes 66, 67, a low power focusing scheme impedes or prevents these currents from returning to circuit ground through either the current or voltage sense electrodes 42 & 43. Only that portion of the drive current that penetrates beyond the borehole wall, and its resulting potential drops, are sensed by these electrodes 42 & 43. Low-impedance driven equipotential guard/focus electrodes 60, 61, 62, 63 flank both sense electrodes. The considerable portion of the drive current delivered by the control amplifier 49 that is conducted by the drilling mud terminates, or is returned to circuit ground, through the outputs of those circuits driving these interposed guard/focus electrodes 60, 61, 62, 63. They do not reach the sense electrodes.

Secondly, the sensing electrodes 42 & 43 are focused at the borehole wall. The combination of a sensing electrode and both of its flanking equipotential guard/focus electrodes 46 creates a high aspect ratio equipotential cylindrical surface. Such a surface, when surrounded by a finite conductivity medium, will provide a purely radial current distribution over most of its length with fringing effects at both ends. Provided the sensing electrode is far from these fringing effects, the radial geometry of any currents in the local drilling mud will assure that the formation properties in a shallow region adjacent to the borehole wall are being sensed. This is true for both the current sense electrode 42 and the voltage sense electrode 43.

In the case of the virtual-grounded I to E converter 71 shown in FIG. 4, the guard drives may simply be a connection to circuit ground. The alternative grounded-resistor and buffer amplifier I to E converter 70 shown in FIG. 4 is configured so that these guards are driven from a buffer amplifier so as to match the current sense electrode's 42 potential, while still being able to absorb any longitudinal currents without allowing the equipotential to be disturbed. Alternatively, the guards could be driven by a circuit controlled by the digital processing engine 51 in FIG. 2.

The configuration of twin drive electrodes 66,67 equidistant from the current sense electrode 42, further re-enforces the radial current distribution by imposing symmetry about a horizontal plane passing through the current sense electrode 42.

Configured as described above, the system operates as follows. The sonde is inserted into a borehole or other surface opening so that the sonde 40 extends into subsurface material. The signal processor engine 51 generates an induced current that is amplified by control amplifier 49. The drive electrodes 66, 67 connected with the control amplifier 49 induces the current into the surrounding subsurface material. The induced current propagates through the subsurface material and because of the electrical impedance of the subsurface material the phase of the signal after propagating through the subsurface formation varies relative to the induced signal. In particular, the phase varies based upon characteristics of the subsurface formation. The voltage sense electrode 43 detects the resulting out-of-phase voltage, which is correlated with the resulting current detected by current sense electrode 42. The resulting detected analog signal is digitized and processed by a processor, such as the digital processing engine 51. The processor 51 processes the data to compute one or more characteristics of the subsurface material, including resistivity of the subsurface material, time domain induced polarization response of the subsurface material, spectral induced polarization response of subsurface material for a single frequency or a range of frequencies or a spontaneous or self potential observed in the formation. The computed information is then either stored in a non-volatile memory device, such as flash memory, or communicated to the host system 20 at the surface.

Figure 6:
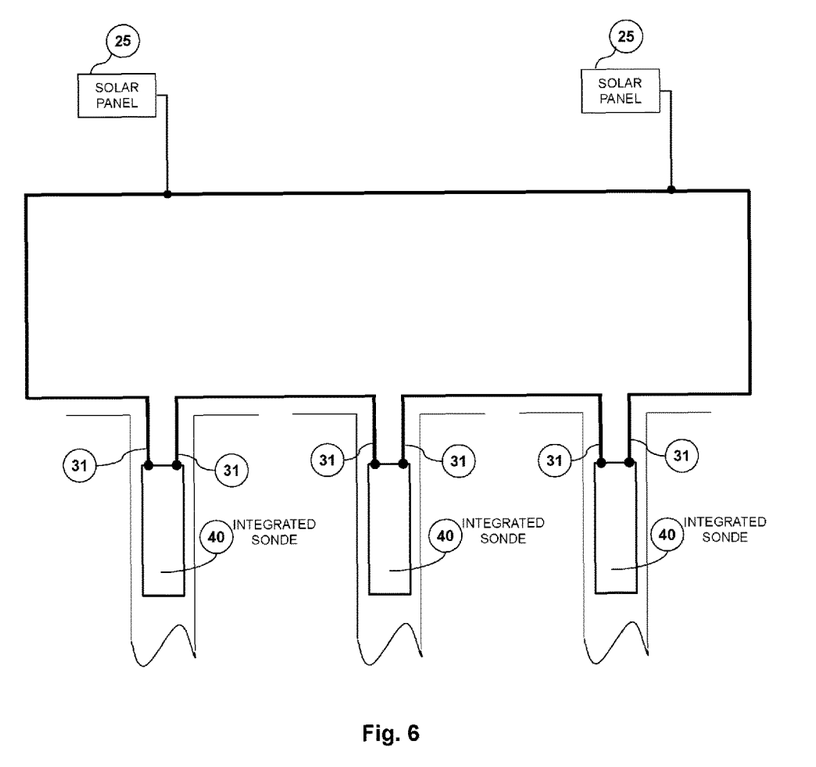
FIG. 6 is a diagrammatic view of an arrangement of multiple interconnected SIP measurement modules.
Figure 7:
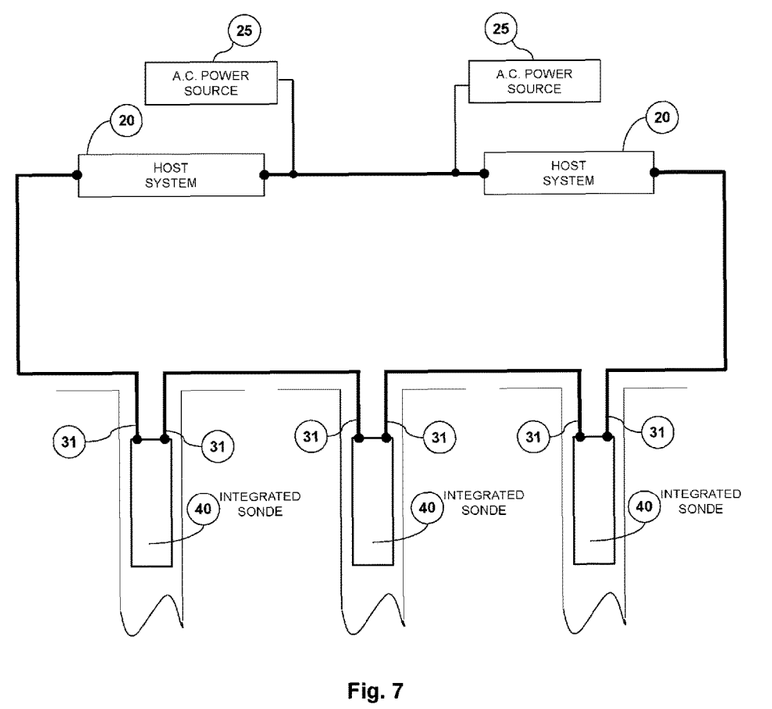
FIG. 7 is a diagrammatic view of an alternate arrangement of a multiple interconnected SIP measurement modules and host systems.

Referring now to FIGS. 6 and 7, a system is illustrated in which multiple sondes 40 are interconnected. Multiple sondes 40 are connected to other sondes 40 and host systems 20 through umbilical-1 and umbilical-2 interfaces 31. As shown in FIG. 7, the system may also include one or more host systems 20. Like the host systems described above, the host systems in FIG. 7 may control operation of the sondes or monitor operation of the sondes or SIP measurements of the sondes. Each sonde may have a plurality of connections for connecting the sonde with one or more other sondes in the arrangement or one or more host system. In the configuration illustrated in FIG. 7 the system includes two host systems 20 and each sonde 40 includes two connectors. Cables connected with the sonde connectors connect each sonde with one sonde and one of the host systems or with two sondes or with two host systems. Additionally, in the present instance, the connections are configured as redundant systems so that if one of sondes or host systems becomes inoperable or a connection in the system is broken, the system, as a whole, remains functional. The system will be able to detect and recover from any soft or hard, software or hardware failure. No single point failure can render the system inoperable. Even if a hard failure occurs, the system can continue to operate at a reduced level of functionality until the failed module is replaced. The reduction in functionality ranges from simply no longer being fault tolerant to the loss of a single sonde or host system. The connections can be any of a variety of connections, such as umbilical-1 or umbilical-2 or alternatively, the connection may be provided by any of a variety of electrical connections or cables.

The connections may vary depending on the application, and may provide interfaces for communication, synchronization, power and external ground reference. FIG. 6 shows a diagrammatic illustration of a fault tolerant arrangement that is a complete ring of interconnected sondes 40 without a host system. The system features two power sources 20 to provide power to the ring of three sondes 40. The connections between the sondes are accomplished via the two umbilical interfaces 31. The power sources can be of any type as supported by sonde 40.

FIG. 7 shows a diagrammatic illustration of a fault tolerant arrangement that is a complete ring of three interconnected sondes 40 and two host systems 20 and two power sources 25. The power sources could be of any type as supported sonde 40.

In the foregoing description, the system is described as having a sonde 40 that incorporates a signal generator, a drive electrode, a plurality of electrodes for detecting the current and voltage in the formation and a processor for processing the detected current and voltage. All of which are housed within a housing of the sonde. However, it should be appreciated that these electronics may be incorporated into an instrument other than a sonde. For instance, the elements illustrated in FIG. 3 or FIG. 4 may be incorporated into a housing that is connected with a drilling rig, a separate borehole logging instrument or other element for creating a subsurface opening or for being inserted into a subsurface opening.

Additionally, although the instrument 40 has been described in the foregoing discussion as being used in a borehole it should be understood that the instrument can be used in any of a variety of geophysical applications in which the instrument is inserted into a subsurface opening that is either manmade (such as a borehole) or naturally occurring. Similarly, in addition to being operable to measure characteristics of geologic formations, the instrument can be used to make SIP measurements of other structures or formations, including manmade structures.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims. These changes or modifications include i) alternate arrangement of electrodes, ii) alternate number of electrodes, iii) alternate spatial geometry of electrodes, iv) alternate focusing/guarding electrode configurations, v) no guard/focus electrodes, vi) alternate guard/focus techniques (including none), vii) alternate excitation waveforms, viii) excitation signal originating from outside of the sonde or the system that is placed at the surface, ix) autonomous closed loop control of excitation and focusing which is performed within sonde or system that is placed at the surface. Additionally, sonde 40 can be embodied as a system that is placed at the surface to measure near surface characteristics of the earth. Additionally, the sonde 40 can be embodied as a system that is placed under water to measure water and subseafloor characteristics.

The invention claimed is:

1. A system for spectral induced polarization measurement of subsurface material, comprising:
   a subsurface instrument configured to perform spectral induced polarization measurements, wherein the instrument is configured to be inserted into a surface opening and the instrument comprises:
   a housing;
   a signal generator for providing an excitation signal wherein the signal generator is within the housing;
   a drive electrode for providing the excitation signal to propagate through subsurface material;
   a voltage sensing electrode for sensing voltage in the subsurface material;
   a current sensing electrode for sensing current in the subsurface material
   a processor for processing receiving the voltage sensed by the voltage sensing electrode and the current sensed by the current sensing electrode for determining the complex impedance of a formation to measure a property of the subsurface material; and
   a power source for powering components of the system and establishing circuit ground reference wherein the power source is galvanically isolated from earth ground in order to prevent distortion of the measurement.

2. The system of claim 1 wherein the processor calculates the complex impedance of the formation over a range of frequencies.

3. The system of claim 1 wherein the processor is within the housing.

4. The system of claim 3 wherein the drive electrode, the voltage sensing electrode and the current sensing electrode are mounted on the housing.

5. The system of claim 1 comprising:
a voltage detector coupled to the voltage sensing electrode for measuring the voltage in the formation;
a current detector coupled to the current sensing electrode for measuring the current flowing through the formation; wherein the processor calculates the property of the subsurface material based on output from the voltage detector and output from the current detector.

6. The system of claim 1 wherein the power source is within the housing and configured for providing power to the signal generator and the processor.

7. The system of claim 6 wherein the power source comprises a device for storing electricity.

8. The system of claim 6 wherein the power source is connected with an external power source located outside the housing, wherein the external power source is fed by an electric grid or by renewable energy sources such as solar, wind, geothermal, or hydroelectric.

9. The system of claim 6 wherein the power source is a battery within the housing.

10. The system of claim 9 comprising a battery charging circuit and a connection to an external power source for recharging the battery, wherein the external power source is outside the housing.

11. The system of claim 1 comprising a connection operable to connect the instrument with external equipment.

12. The system of claim 11 wherein the connection is galvanically isolated.

13. The system of claim 11 wherein the instrument includes a low power mode of operation in which the signal generator does not generate signals, wherein the instrument can be switched into the lower power mode of operation by the external equipment.

14. The system of claim 11 wherein the connection is operable to provide communications and synchronization between the instrument and the external equipment.

15. The system of claim 11 comprising a plurality of connections connecting a plurality of the subsurface instruments to provide an arrangement of a plurality of the subsurface instruments.

16. The system of claim 15 wherein the arrangement is configured for fault tolerance.

17. The system of claim 11 wherein the connection is configured to provide electricity to the instrument by the external equipment.

18. The system of claim 11 wherein the external equipment is a host system operable to control or monitor the operation of the instrument and to receive the measured properties from the processor.

19. The system of claim 11 wherein the connection is configured to share a ground reference with external equipment.

20. The system of claim 1 wherein the system performs one of the following measurements: resistivity, time domain induced polarization or spontaneous or self-potential measurements.

21. The system of claim 1 comprising a plurality of focusing electrodes configured to alter a path of the current flow in the subsurface material.

22. The system of claim 1 wherein the signal generator is controlled by the processor and the instrument utilizes closed loop controlled excitation.

23. The system of claim 1 wherein the system is configured to measure properties of at least one of: i) drilling mud or water or a combination of both between the system and a wall of a subsurface opening; ii) mud cake layer formed on the wall; iii) mud filtrate area; iv) an invaded zone near the wall; and v) an uninvaded formation of interest.

24. The system of claim 1 wherein the housing comprises a fluid-tight seal to impede the migration of fluid from the surface opening into the housing.

25. The system of claim 1 comprising a nonvolatile storage element wherein the nonvolatile storage element is used to store the calculated property of the subsurface materials.

26. The system of claim 1 comprising a real time clock.

27. The system of claim 26 comprising a backup battery wherein the real time clock is powered by the backup battery.

28. The system of claim 1 comprising a temperature sensor configured to measure the temperature of the subsurface material.

29. The system of claim 1 wherein the processor calculates the amplitude and phase of the voltage and the amplitude and phase of the current in the subsurface material at a frequency of the excitation signal.

30. The system of claim 29 wherein the signal generator varies the frequency of the excitation signal.

31. The system of claim 30 wherein the processor calculates the amplitude and phase of the voltage and the amplitude and phase of the current in the subsurface material for each of a plurality of the frequencies of the excitation signal.

32. A system for spectral induced polarization measurement of subsurface material, comprising:
a signal generator for providing an excitation signal;
a drive electrode for providing the excitation signal to propagate through the subsurface material;
a current sensing electrode providing a current path for current in the subsurface material;
a voltage sensing electrode for sensing voltage in the subsurface material;
a local voltage sensing electrode for sensing voltage in the subsurface material wherein the local voltage sensing electrode is proximal the current sense electrode;
a circuit for determining the voltage between the local voltage sensing electrode and the voltage sensing electrode;
a circuit for determining current flowing through the current sensing electrode;
a processor for processing the determined current and the determined voltage to determine a property of the subsurface material;
a power source for supplying power to the signal generator, the circuit for determining voltage, the circuit for determining current and the processor, wherein the power source provides a ground reference; and
a plurality of guard electrodes, wherein the guard electrodes are configured to alter a path of the current flow in the subsurface material.

33. The system of claim 32 wherein the guard electrodes are equipotential guard electrodes and the current sense electrode is disposed between the equipotential guard electrodes.

34. The system of claim 33 wherein the circuit for detecting current is of the virtual ground type and the guard electrodes are connected to the ground reference.

35. The system of claim 32 comprising a plurality of local voltage sense electrodes proximal to the current sense electrode wherein the current sense electrode is disposed between at least two of the local voltage sense electrodes.

36. The system of claim 35, wherein the drive electrode, sensing electrode, guard electrodes and the local voltage sense electrodes are attached to a fluid-tight housing configured to be inserted into a subsurface opening.

37. The system of claim 32 wherein the circuit for detecting current is of the grounded resistor type and the guard electrodes are driven.

38. The system of claim 37 wherein the guard electrodes are driven to match the potential of the local voltage sense electrode.

39. The system of claim 37 wherein the guard electrodes are driven to control the focusing direction and depth.

40. The system of claim 32 wherein the guard electrodes are equipotential guard electrodes and the voltage sense electrode is disposed between the equipotential guard electrodes.

41. The system of claim 40 wherein the guard electrodes are driven.

42. The system of claim 40 wherein the guard electrodes are driven to a potential matching the potential sensed at the voltage sense electrode.

43. The system of claim 40 wherein the guard electrodes are driven to control the focusing direction and depth.

44. The system of claim 32 wherein the guard electrodes are equipotential guard electrodes and the voltage sense electrode is disposed between the equipotential guard electrodes and the equipotential guard electrodes are driven.

45. The system of claim 44 wherein the equipotential guard electrodes are driven to match the potential of the voltage sense electrode.

46. The system of claim 44 wherein the guard electrodes are driven to control the focusing direction and depth.

47. The system of claim 32 comprising a plurality current drive electrodes wherein the current sense electrode is located between the current drive electrodes.

48. The system of claim 32 wherein the processor performs resistivity or time domain induced polarization measurements.

49. The system of claim 32 wherein the processor utilizes closed loop controlled excitation and focusing.

50. The system of claim 32 wherein the system is configured to measure properties of at least one of: i) drilling mud or water or a combination of both between the system and a wall of a subsurface opening; ii) mud cake layer formed on the wall; iii) mud filtrate area; iv) an invaded zone near the wall; and v) an uninvaded formation of interest.

51. The system of claim 32 wherein the system is configured for low power focusing.

\* \* \* \* \*